T. W. DINNING AND E. H. CLYMER.
VEHICLE SLED.
APPLICATION FILED FEB. 23, 1921.
1,422,041.
Patented July 4, 1922.
2 SHEETS—SHEET 1.
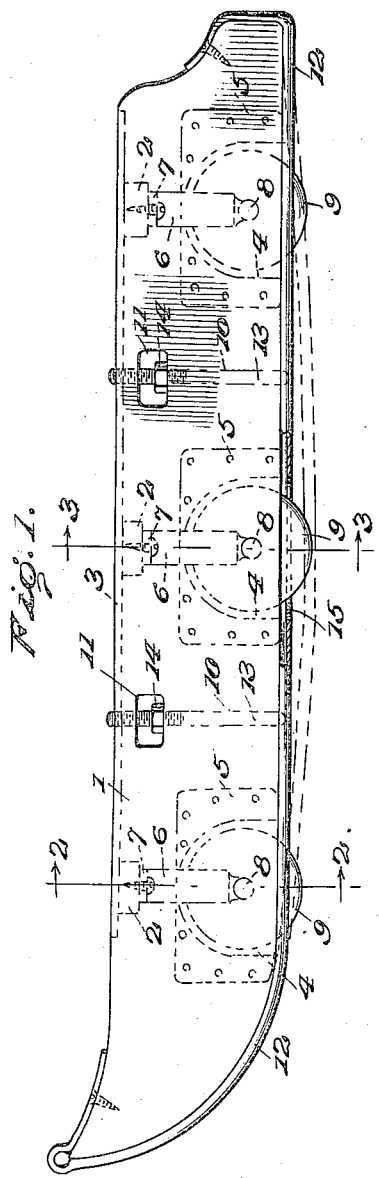
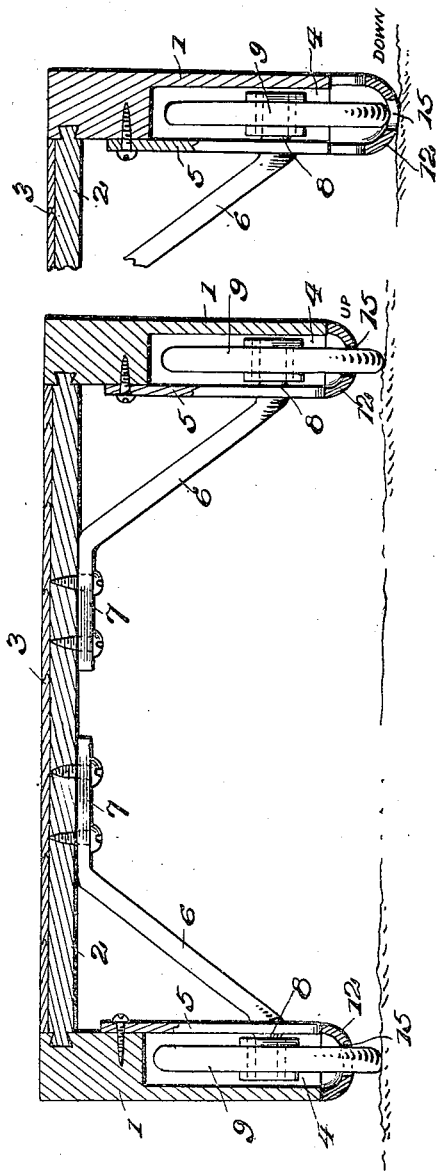
T. W. Dinning and E. H. Clymer,
INVENTORS.
BY
F. P. Gorin
ATTORNEY.

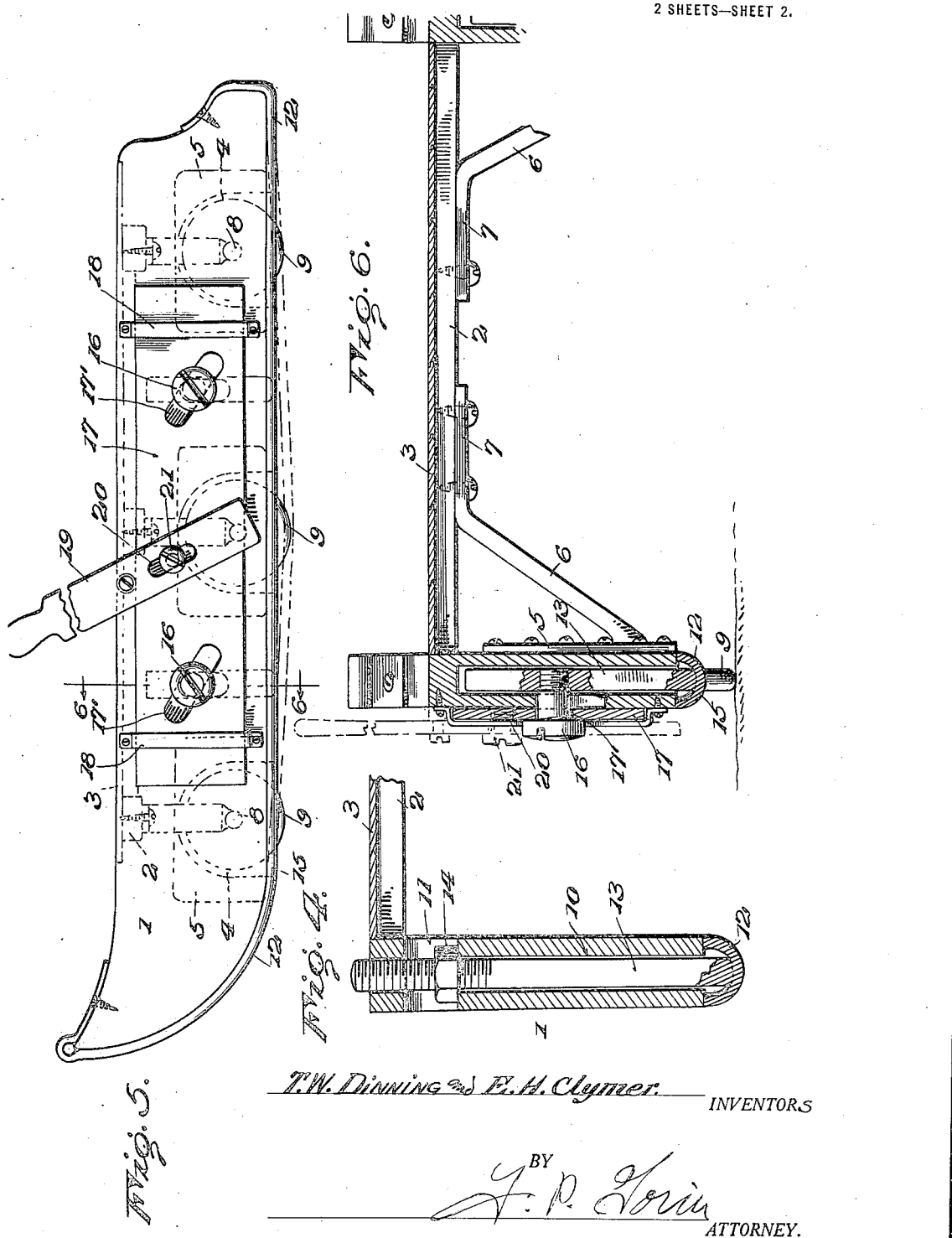

UNITED STATES PATENT OFFICE.

THOMAS W. DINNING AND EARL H. CLYMER, OF RENTON, WASHINGTON.

VEHICLE SLED.

1,422,041.  Specification of Letters Patent.  Patented July 4, 1922.

Application filed February 23, 1921. Serial No. 447,344.

*To all whom it may concern:*

Be it known that we, THOMAS W. DINNING and EARL H. CLYMER, are citizens of the United States, and residing at Renton, in the county of King and State of Washington, have invented certain new and useful Improvements in Vehicle Sleds, of which the following is a specification.

This invention relates to a combined wheeled vehicle and sled.

An object of the invention is to provide a novel means for mounting the wheels in the side members of the body.

Another object of the invention is to provide means for extending the runner beyond the lower plane of the wheels to convert the vehicle into a sled.

The invention also comprehends improvements in the details of construction, which are particularly pointed out in the following description and claims.

In the drawings:—

Fig. 1 is a side elevation of the sled.

Fig. 2 is a sectional view on line 2—2 of Fig. 1.

Fig. 3 is a sectional view on line 3—3 of Fig. 1.

Fig. 4 is a detail section of the means for projecting the runner.

Fig. 5 is a side elevation showing a modified form of means for extending the runner.

Fig. 6 is a sectional view on line 6—6 of Fig. 5.

The body of the vehicle is formed with side members 1, connected at their top portions and held in spaced relation by cross bars 2, on which is secured the seat or top portion 3. The side members are shaped similar to the side members of the usual sled and are provided with a series of recesses 4 open at the bottom and on the inner face of said side members. Plates 5 are secured on the inner face of the side members over the recesses 4 and close the side opening of said recesses, and are formed with bracing extensions 6, which are secured to the cross bars 2 as indicated at 7. These plates are also formed with stub shafts 8 extending into the recesses 4, and on which are rotatably mounted wheels 9. The diameter of the wheel in the central recess of each side member is larger than the diameter of the other wheels for a purpose which will presently be described.

The side members are formed with vertical bores indicated at 10, and transverse openings 11 into which the bores 10 open. Runners 12 are secured to the lower edge of each side member and have their ends extending around the ends and secured to the top edge of said side member near the ends thereof. This runner is flexible and is adapted to be spaced from the lower edge of the side members to extend beyond the lower plane of the wheels when it is desired to use the vehicle as a sled. For this purpose, standards 13 are secured to the runner as shown, and extend upwardly through the bores 10 and have their upper ends threaded for engagement with adjusting nuts 14, which are seated in the transverse openings 11. By adjusting the nut 14, the runner may be projected to extend below the lower edge of the body member and below the plane of the lower periphery of the wheels, so that the vehicle may be used as a sled, and when it is desired to use it as a wheel vehicle, the runners will be seated against the lower edge of the side members. To permit the runners to seat against the lower side of the side members, they are provided with a series of recesses 15, so that the wheels will project through the recesses in the runner to engage the ground.

When this vehicle is used as a wheeled vehicle, it is steered by rocking it back and forth from the front to the rear wheels and giving it the necessary turning motion in this act in the manner similar to that for steering a sled.

Figs. 5 and 6 show a modification of the means for projecting the runner, and in which the side members are formed with elongated vertical recesses instead of the transverse openings, into which the bores extend. The standards have studs 16 extending through the vertical recesses and threaded into the upper ends of said standards. Plates 17 are mounted for sliding movement in brackets 18 secured to the outer sides of the side members, and are formed with a plurality of diagonal slots 17′ through which the studs 16 project. Levers 19 are pivoted adjacent the upper edge of each side member and are formed with a slot 20 in the lower end portion, through which pins 21 extend and which are secured to the plates 17. The upper end of the levers form handles for operating the side plates, and in the sliding movement of these side plates, the diagonal grooves will engage the studs 16 and either project or contract the runners according to the direction of movement.

It will be noted from the above description that a simple and rigid means has been provided for supporting the wheels, and which may be easily removed from the side members for replacement in case of breakage, et cetera, and which will take up all of the wear from the wheels. The wheels may be mounted on the stub shaft with ball bearings, roller bearings, or with any suitable friction reducing connection.

It will also be noted that when the device is used as a wheeled vehicle, the runners will lie flush against the bottom edge of the side members and there will be little danger of injuring the runners when in this position, and which will also make a compact structure. These runners may also be extended, so that the vehicle may be used as a sled with comparatively little trouble on the part of the operator.

What is claimed as new, is:—

1. A wheel vehicle and sled comprising side members and a seat portion connecting the side members, the side members being formed with wheel receiving recesses open on the inside of the side members, wheel supporting members mounted on the side members closing the open recesses, wheels carried by said wheel supporting members and extending in the recesses, the lower portion of the periphery of said wheels projecting below the side members, runners having the ends secured to the side members, and means for projecting the runners beyond the plane of the lower periphery of the wheels.

2. A wheel vehicle and sled comprising a body having side members formed with wheel receiving recesses, wheel supporting members mounted over the recesses, wheels carried by said supporting members extending in the recesses and below the lower edge of the side members, runners having the ends secured to the edge of the side members and extending along the lower edges of the side members, and means for projecting the runners below the plane of the lower periphery of the wheels.

3. A wheel vehicle and sled comprising a body formed with side members having a series of wheel receiving recesses formed therein, wheel supporting members mounted over the recesses formed with brace portions secured to the body and stub shafts, wheels rotatably mounted on said stub shafts and disposed in the recesses in the side members and having their lower peripheries extending below the bottom edges of the side members, runners extending along the bottom edges of the side members secured thereto at each end and adapted to be spaced from the edge of the side members, and means for spacing the runners from the side members to project beyond the plane of the lower peripheries of the wheels.

4. A wheel vehicle and sled comprising a body having side members, wheels mounted in the side members and extending below the lower edge of the side members, runners having their ends secured to the edge of the said side members, standards secured to the runners and extending through the bores formed in the side members, and means engaging the standards to project the runners below the plane of the lower peripheries of the wheels.

5. A wheel vehicle and sled comprising a body having side members, wheels mounted in the side members and having their peripheries extending below the lower edge of said side members, runners extending around the edges of the side members and being secured thereto at the ends, standards secured to the runners between the ends and extending through bores formed in the side members and having projections thereon, plates slidably mounted on the the side members formed with diagonal grooves through which said projections extend, and means for operating the side plates whereby the runners will be projected beyond the plane of the lower peripheries of the wheels.

In testimony whereof we affix our signatures.

THOMAS W. DINNING.
EARL H. CLYMER.